United States Patent
Itogawa (10) Patent No.: US 11,106,955 B2
(45) Date of Patent: Aug. 31, 2021

(54) PRINTER

(71) Applicant: BROTHER KOGYO KABUSHIKI KAISHA, Nagoya (JP)

(72) Inventor: Yoshihiro Itogawa, Mizuho (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 0 days.

(21) Appl. No.: 16/696,067

(22) Filed: Nov. 26, 2019

(65) Prior Publication Data

US 2020/0175345 A1 Jun. 4, 2020

(30) Foreign Application Priority Data

Nov. 30, 2018 (JP) .............................. JP2018-225743

(51) Int. Cl.
*G06F 3/12* (2006.01)
*G06K 15/02* (2006.01)
*H04N 1/00* (2006.01)

(52) U.S. Cl.
CPC ....... *G06K 15/181* (2013.01); *G06K 15/1848* (2013.01); *G06K 15/1885* (2013.01); *G06K 15/1886* (2013.01); *H04N 1/00498* (2013.01)

(58) Field of Classification Search
CPC ............. G06K 15/181; G06K 15/1885; G06K 15/1848; G06K 15/1886; G06K 15/005; G06K 15/1807; G06K 15/1822; H04N 1/00498
See application file for complete search history.

(56) References Cited

U.S. PATENT DOCUMENTS

| 2005/0191034 A1 | 9/2005 | Sakon |
| 2012/0194864 A1* | 8/2012 | Oshima ................ G06K 15/005 358/1.15 |
| 2015/0242369 A1 | 8/2015 | Hagiwara et al. |

FOREIGN PATENT DOCUMENTS

| JP | 2005-243170 A | | 9/2005 |
| JP | 2007280217 A | * | 10/2007 |
| JP | 2015-158726 A | | 9/2015 |

* cited by examiner

*Primary Examiner* — Huo Long Chen
(74) *Attorney, Agent, or Firm* — Scully, Scott, Murphy & Presser, PC (57) ABSTRACT

A printer includes a print engine, a processor, and a memory. The print engine is configured to print an image on a print medium. The memory stores instructions, the instructions, when executed by the processor, causing the printer to perform: in a case where a plurality of layers is included in a document file that is acquired from one of a storage medium connected to the printer and an apparatus configured to communicate with the printer, determining whether the plurality of layers includes a selection target layer that is a layer corresponding to a same language as a language indicated by language information acquired from an information source; in response to determining that the plurality of layers includes the selection target layer, determining a layer including the selection target layer as a print target layer; and controlling the print engine to print the print target layer.

9 Claims, 9 Drawing Sheets

PRINTER

CROSS REFERENCE TO RELATED APPLICATIONS

This application claims priority from Japanese Patent Application No. 2018-225743 filed Nov. 30, 2018. The entire content of the priority application is incorporated herein by reference.

TECHNICAL FIELD

This disclosure relates to a printer and so on.

BACKGROUND

A PDF file can be set to include layers. The term "PDF" is an abbreviation of "Portable Document Format". A layered PDF file is configured so that the display/non-display of each layer can be switched when the file is displayed by a viewer. Each layer has setting of whether to be displayed, and the setting can be selected from three settings of "always print", "always not print", and "print when displayed".

For example, as an example of the use of the layered PDF file, a document discloses a technique to generate a drawing layer and document data for viewing superposed as one file so that each of the former and the latter can be selectively displayed.

SUMMARY

According to one aspect, this specification discloses a printer. The printer includes a print engine, a processor, and a memory. The print engine is configured to print an image on a print medium. The memory stores instructions, the instructions, when executed by the processor, causing the printer to perform: in a case where a plurality of layers is included in a document file that is acquired from one of a storage medium connected to the printer and an apparatus configured to communicate with the printer, determining whether the plurality of layers includes a selection target layer that is a layer corresponding to a same language as a language indicated by language information acquired from an information source; in response to determining that the plurality of layers includes the selection target layer, determining a layer including the selection target layer as a print target layer; and controlling the print engine to print the print target layer.

According to another aspect, this specification also discloses a method of printing a document file including a plurality of layers. The method includes: in a case where a plurality of layers is included in a document file that is acquired from one of a storage medium connected to the printer and an apparatus configured to communicate with the printer, determining whether the plurality of layers includes a selection target layer that is a layer corresponding to a same language as a language indicated by language information acquired from an information source; in response to determining that the plurality of layers includes the selection target layer, determining a layer including the selection target layer as a print target layer; and controlling a print engine to print the print target layer.

According to still another aspect, this specification also discloses a non-transitory computer-readable storage medium storing a set of program instructions for controlling a printer including a processor, a memory, and a print engine configured to print an image on a print medium. The set of program instructions, when executed by the processor, causes the printer to perform: in a case where a plurality of layers is included in a document file that is acquired from one of a storage medium connected to the printer and an apparatus configured to communicate with the printer, determining whether the plurality of layers includes a selection target layer that is a layer corresponding to a same language as a language indicated by language information acquired from an information source; in response to determining that the plurality of layers includes the selection target layer, determining a layer including the selection target layer as a print target layer; and controlling the print engine to print the print target layer.

BRIEF DESCRIPTION OF THE DRAWINGS

Embodiments in accordance with this disclosure will be described in detail with reference to the following figures wherein.

DETAILED DESCRIPTION

The inventor of this invention considers the preparation of a multilingual PDF file using a layered PDF file. The multilingual PDF file is configured so that an image not depending on a language and the like is set as a common layer and only a language part is set as a separate layer corresponding to each language (for example, an English layer and a Japanese layer). By using the layer configuration as described above, each of the same number of language layers as the number of languages need not have same image data, thereby reducing the file size by that amount.

In the case of the multilingual PDF file, one language is displayed by default. Regarding languages other than the language displayed by default, a desired language is displayed by switching the display/non-display of the layer by the viewer. These layers provided for the respective languages (hereinafter also may be referred to as language layers) are configured so that, by setting each layer as "print when displayed", the language displayed on the viewer can be printed when the desired language is displayed on the viewer.

However, when a direct print function that provides a printing operation without displaying by the viewer is used, a desired language cannot be printed after being displayed on the viewer. Thus, if a PDF file is printed based on a default display setting, the PDF file cannot be printed in languages other than the default display language. Thus, if a multilingual file including Japanese and English is printed by using the direct print function for example, even when a user desires printing in Japanese, an English layer is printed against the intention of the user if the file has a default display setting in English, and a Japanese layer cannot be printed.

The problem as described above is not limited to the PDF as a specific format. Specifically, this problem may be caused, in addition to the PDF-format one, also in any multilingual file configured so that a plurality of layers are switched to display one of a plurality of languages.

In view of the foregoing, an aspect of an object of this disclosure is to provide a printer configured to, when a multilingual file is printed by using the direct print function, print a file in a language that is assumed as the language desired by the user.

Some aspects of this disclosure will be described while referring to the attached drawings.

[Configuration of MFP]

Figure 1:
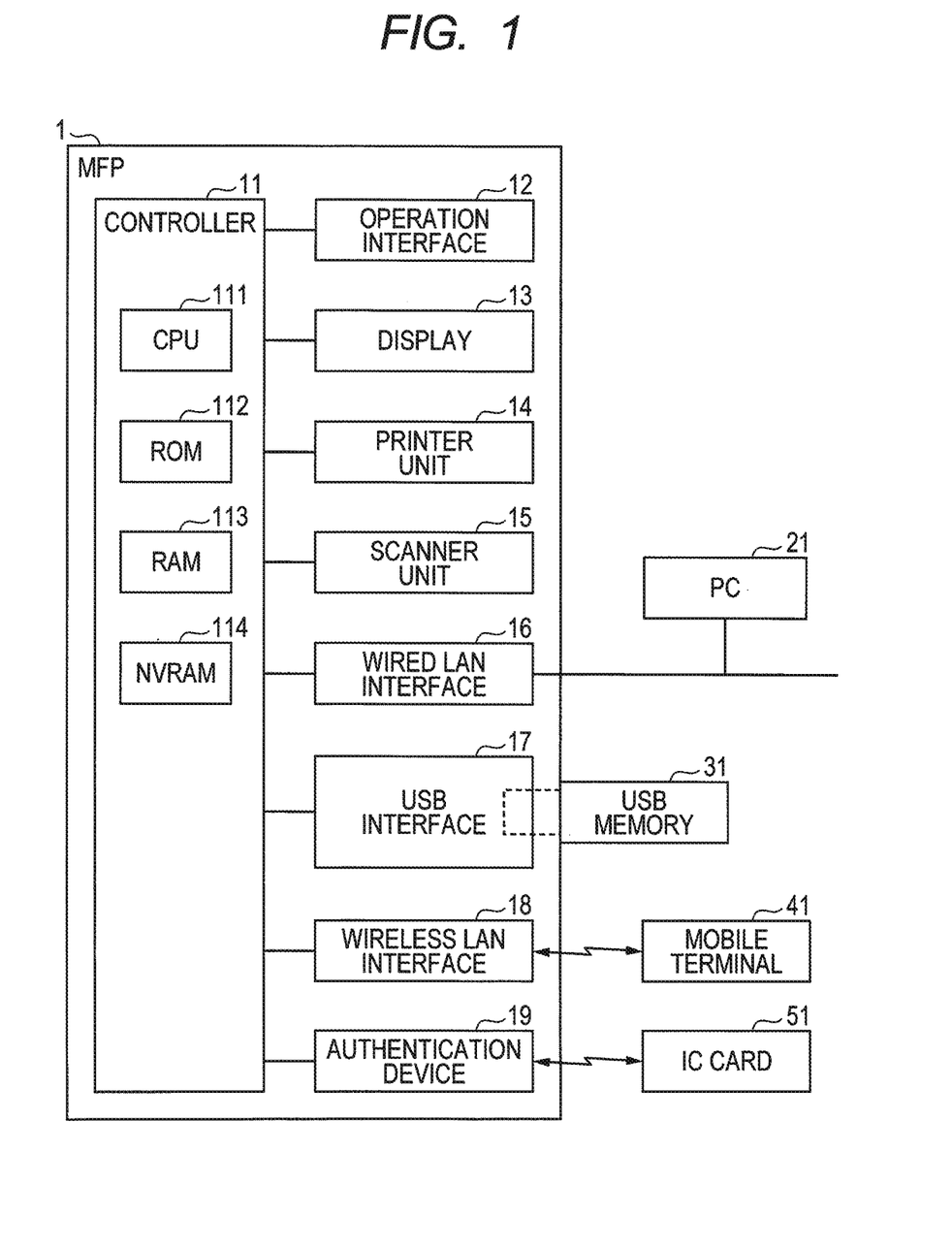
FIG. 1 is a block diagram showing the configurations of an MFP and its peripheral devices.

As shown in FIG. 1, an MFP (multifunction peripheral) 1 having a configuration as an example of a printer of this disclosure will be described below. The MFP 1 includes a controller 11, an operation interface 12, a display 13, a printer unit 14, a scanner unit 15, a wired LAN interface 16, a USB interface 17, a wireless LAN interface 18, and an authentication device 19. The controller 11 includes a CPU 111, a ROM 112, a RAM 113, and an NVRAM (Non Volatile RAM) 114. The CPU 111 (an example of a processor) executes particular processing based on a control program stored in the ROM 112 or the RAM 113 (an example of a memory) to thereby control the respective parts of the MFP 1.

The operation interface 12 includes a touch panel and various switches. The display 13 includes a liquid crystal display and various lamps. A touch panel provided in the operation interface 12 is arranged while being superposed on a surface of the liquid crystal display provided in the display 13. The liquid crystal display displays images such as an image of buttons required to operate the touch panel. The liquid crystal display is configured so that a touch operation to such an image can be detected through the touch panel. The liquid crystal display also displays information related to the MFP 1.

The printer unit 14 (an example of a print engine) in this embodiment is configured so that an image can be formed on a sheet-like recording medium based on the inkjet method. However, the printer unit 14 also may be configured so that an image can be formed based on a well-known recording method other than the inkjet method (for example, an electro-photographic method). The scanner unit 15 includes a one dimensional image sensor having reading elements arranged in one direction. The scanner unit 15 is configured so that the image sensor moves in a direction (sub-scanning direction) orthogonal to a direction (main scanning direction) along which the reading elements of the image sensor are arranged to read an image of an original document placed on a transparent document table. The scanner unit 15 is configured to read the image of the original document fed by an ADF (Automatic Document Feeder).

The wired LAN interface 16 is configured by a communication interface device compatible with a wired LAN (Local Area Network) standard. The MFP 1 communicates with a network apparatus (for example, a PC (Personal Computer) 21 shown in FIG. 1) connected to the wired LAN through the wired LAN interface 16.

The USB interface 17 is configured by a USB (Universal Serial Bus) standard-compatible communication interface device. The USB interface 17 is connected to various USB standard-compatible devices (for example, a USB memory 31 illustrated in FIG. 1).

The wireless LAN interface 18 is configured by a wireless LAN standard-compatible communication interface device. The MFP 1 communicates with wireless LAN-compatible network apparatus (for example, a mobile terminal 41 illustrated in FIG. 1) through the wireless LAN interface 18.

The authentication device 19 is configured by an IC card reader, for example. The MFP 1 communicates with an IC card 51 through the authentication device 19. The controller 11 determines whether the IC card 51 has user registration, based on information acquired from the IC card 51 through the authentication device 19. When the IC card 51 has user registration, the use of the MFP 1 is permitted. Alternatively, the permission level for the MFP 1 may be determined based on the information acquired from the IC card 51 and, based on the determination result, the use of all functions may be permitted or the use of some functions may be restricted.

The MFP 1 may have various configurations in addition to the configuration shown in FIG. 1. However, configurations not related to the main part of this disclosure will not be further illustrated or described.

[Function of MFP]

The MFP 1 has a direct print function. The direct print function in this embodiment means a function according to which a file is transmitted from various devices connectable to the MFP 1 (for example, the USB memory 31 and the mobile terminal 41) to the MFP 1 to directly print the contents of the file through the MFP 1. The use of the direct print function allows even a device not including a display hardware (for example, the USB memory 31) to print the contents of the file stored in the device.

The use of the direct print function also allows a device (for example, the mobile terminal 41) having display hardware and not having display software (hereinafter referred to as a viewer) to print the contents of a file stored in the device. The use of the direct print function also allows a device having display hardware and a viewer to print the contents of a file stored in the device without requiring starting up the viewer.

The MFP 1 is configured to print a PDF file as a print target to be printed by the direct print function. The PDF file includes a plurality of layers. The plurality of layers has display settings for each layer. The display settings for each layer include one of "setting to be displayed by default (which corresponds to first display setting)" and "setting not to be displayed by default (which corresponds to second display setting)". When the contents of a PDF file are displayed by the viewer based on the display setting of the PDF file, then a layer having the display setting of "to be displayed by default" is displayed while a layer having the display setting of "not to be displayed by default" is not displayed. The display settings for each layer is arbitrarily switched between "to be displayed" and "not to be displayed" by operating the viewer.

A plurality of layers has print settings, for each layer. Each layer has print settings including one of the three settings of "always printed" (which corresponds to first print setting), "printed when displayed" (which corresponds to second print setting), and "always not printed" (which corresponds to third print setting). When the contents of a PDF file are printed by the viewer based on the print setting of the PDF file, a layer having the print setting of "always printed" is always printed while a layer having the print setting of "always not printed" is always not printed. A layer having the print setting of "printed when displayed" is printed when the layer is being displayed by the viewer and is not printed when the layer is not being displayed by the viewer.

By using the layers as described above, a multilingual PDF file can be provided. Specifically, in order to form a PDF file including a plurality of languages, the PDF file is configured to include a common layer including objects (drawing objects) not depending on the languages (for example, image data) and a plurality of language layers including objects depending on a plurality of languages (for example, text data).

The plurality of language layers is configured so that any one language layer is selectively displayed by using the above-described display settings. The common layer is configured to be always displayed when any one of the plurality of language layers is being displayed. With the multilingual PDF file having the configuration as described above, the file can be displayed in accordance with the plurality of languages by switching the language layers.

The object provided in the common layer is commonly used for the display of any of the plurality of languages. This consequently suppresses the file size from being increased when compared with a case where an object similar to an object provided in the common layer is provided in each of a plurality of language layers.

[Print Processing]

Next, the following section will describe the print processing executed in the MFP 1 based on FIG. 2 to FIG. 5. The print processing described below is a processing executed when the MFP 1 prints a PDF file by using the direct print function. When the multilingual PDF file as described above is selected as a print target file in the print processing, a language layer corresponding to the language setting in the MFP 1 is selected as a print target layer from among a plurality of language layers included in the PDF file and a print operation is executed by the MFP 1.

Figure 2:
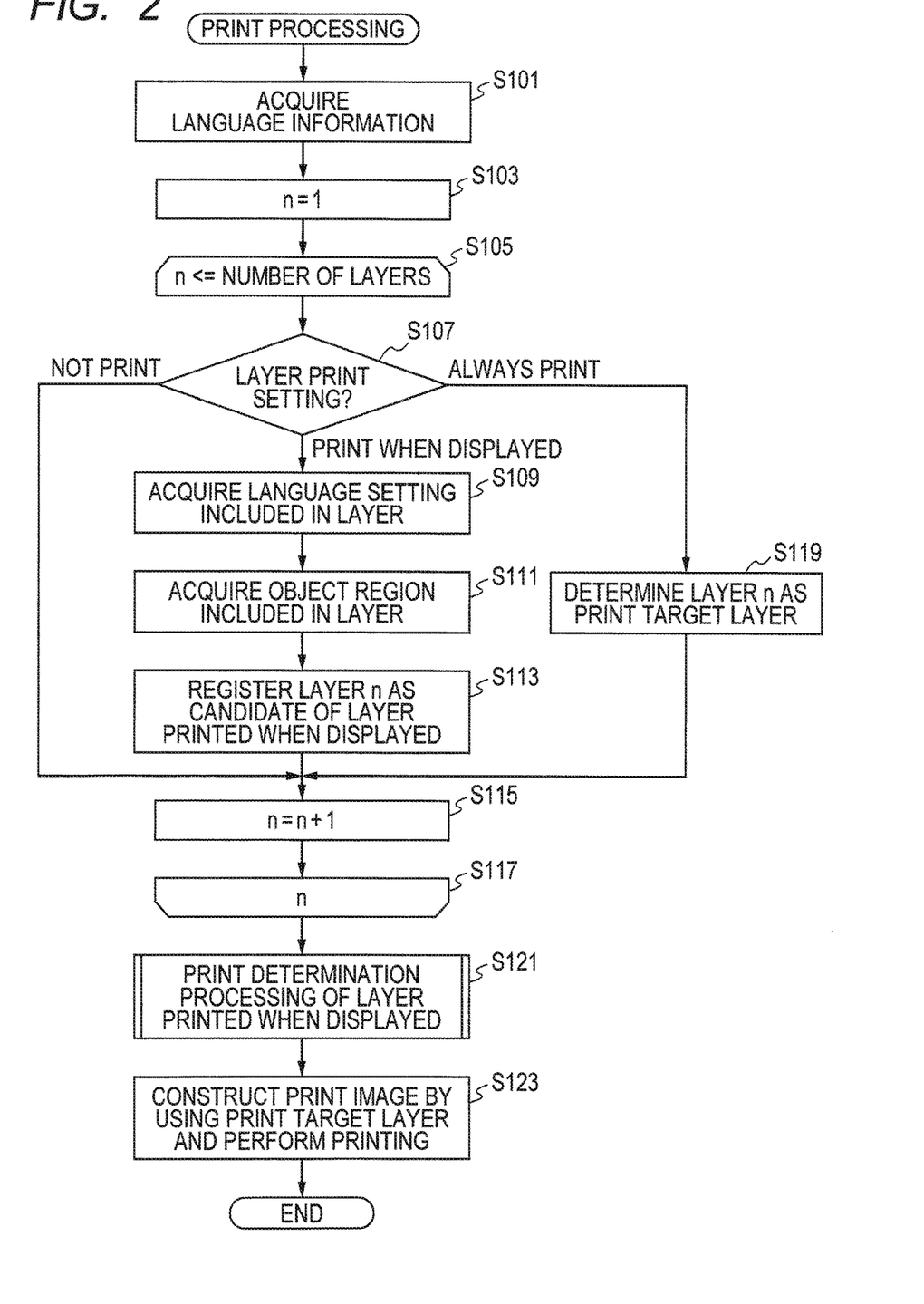
FIG. 2 is a flowchart showing print processing.

As shown in FIG. 2, when the print processing is started, the MFP 1 acquires language information in S101. The MFP 1 is configured so that one language selected from among a plurality of languages (for example, Japanese and English) can be set as the language for the MFP 1. Information showing which language is selected is stored as language information in the NVRAM 114. In S101, the language information stored in the NVRAM 114 is read out to thereby acquire the language information.

In S103, the MFP 1 sets a counter n to 1. In S105, the MFP 1 compares the value of the counter n with the number of the layers included in the PDF file to repeatedly execute S105-S117 when the value of the counter n is equal to or lower than the number of the layers. When the processing proceeds to S107, the MFP 1 determines which of "always print", "not print", and "print when displayed" is the print setting of the n-th layer.

In S107, when the n-th layer has a print setting of "printed when displayed", in S109 the MFP 1 acquires the language setting included in the n-th layer. In this embodiment, the language setting included in the layer is presumed based on information for "Encoding", "CMap", and the like of fonts used for the layer. The information "Encoding" and "CMap" is used to determine a character code for the PDF file.

In S109, for example, when objects included in the n-th layer include only text data and include a Japanese font, it is assumed that the n-th layer is a Japanese language layer. When an object included in the n-th layer includes only text data and includes an English font, it is assumed that the n-th layer is an English language layer. When the n-th layer includes a Japanese font object and an English font object at the same time, the n-th layer is not assumed as a language layer, even when the object includes only text data. The n-th layer is also not assumed as a language layer when the n-th layer includes an object of image data and the like.

In S111, the MFP 1 acquires an object region included in the n-th layer. In S111, the type of the object and the coordinate of the object in the layer are acquired for each of one or more objects included in the n-th layer. In S113, the MFP 1 registers the n-th layer as a candidate of layer printed when displayed. In S113, the n-th layer is additionally registered in a list of candidates of layer printed when displayed. The list of candidates of layer printed when displayed also includes the registration of the information acquired in S109 and S111. In S115, the MFP 1 increments the counter n. When the processing reaches S117, the processing returns to S105.

When the n-th layer in S107 has a print setting of "always print", in S119 the MFP 1 determines the n-th layer as a print target layer. After S119 is completed, the processing proceeds to the above-described S115. When the n-th layer in S107 has a print setting of "not print", the processing proceeds to the above-described S115. When the value of the counter n exceeds the number of the layers after repeating execution of S105-S117, the processing proceeds to S121.

Figure 3:
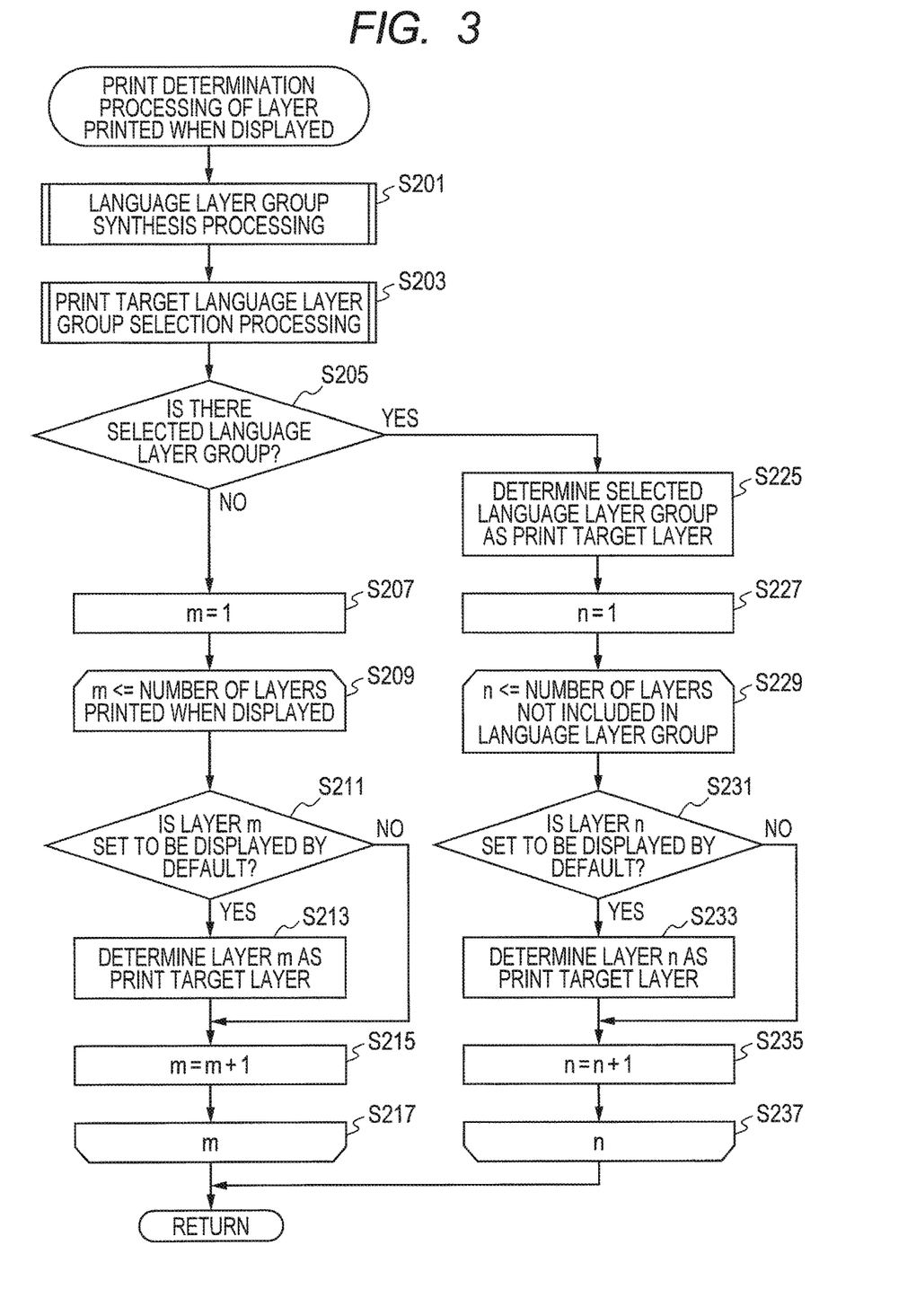
FIG. 3 is a flowchart showing print determination processing of a layer printed when displayed.
Figure 4:
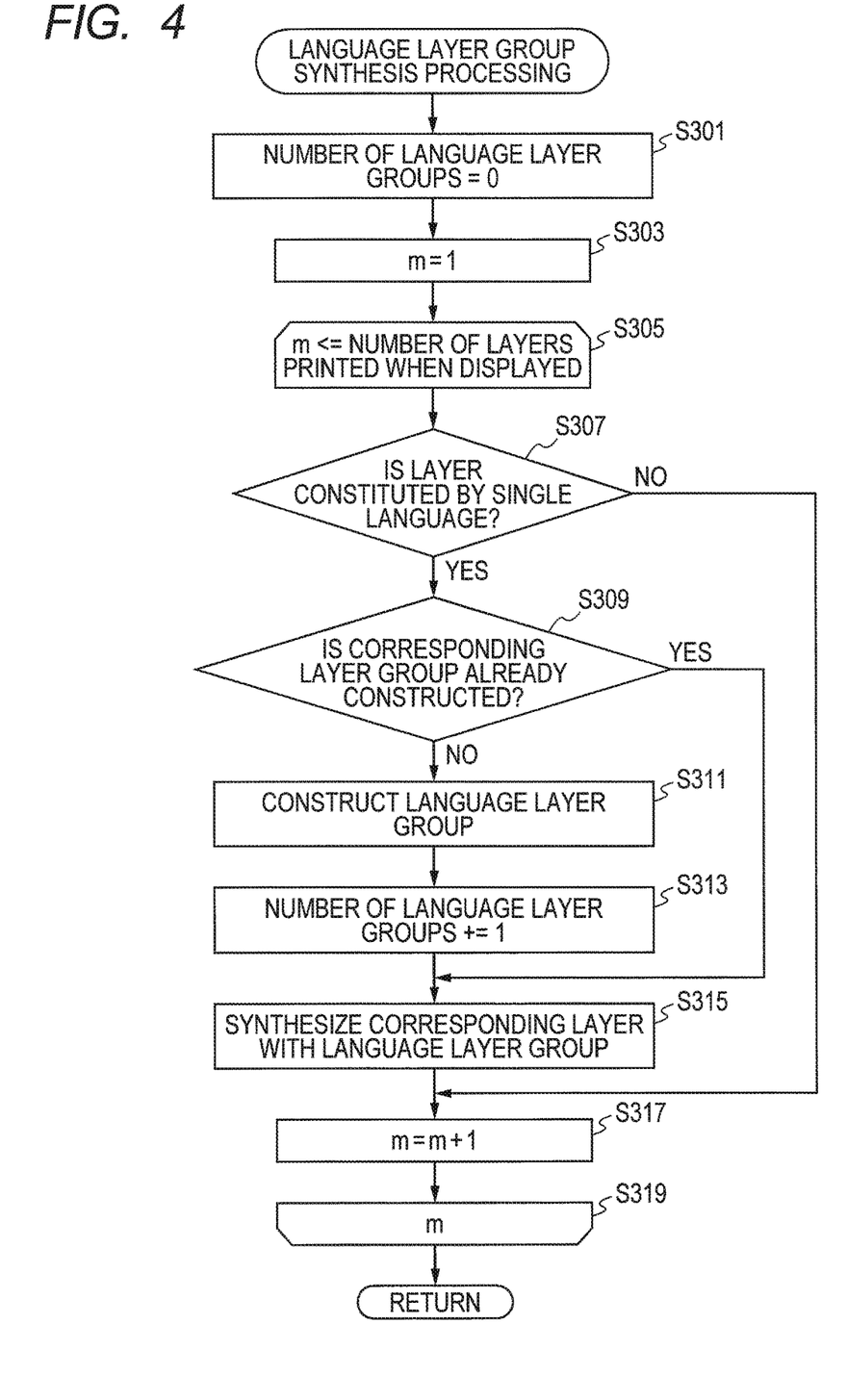
FIG. 4 is a flowchart showing language layer group synthesis processing.

In S121, the MFP 1 executes print determination processing for layer printed when displayed. The details of S121 are shown in FIG. 3. When the print determination processing for layer printed when displayed is started, the MFP 1 in S201 executes language layer group synthesis processing. The details of S201 are shown in FIG. 4. When the language layer group synthesis processing is started, in S301 the MFP 1 sets the number of language layer groups to 0.

In S303, the MFP 1 sets the counter m to 1. In S305, the MFP 1 compares the value of the counter m with the number of layers printed when displayed and, while the counter m has a value equal to or lower than the number of layers printed when displayed, S305-S319 is executed repeatedly. The number of layers printed when displayed is the number of layers registered in the list of candidates of layer printed when displayed in the above-described S113.

When the processing proceeds to S307 while repeatedly executing S305-S319, the MFP 1 determines whether the m-th layer is constituted by a single language. In S307, the list of candidates of layer printed when displayed is referred in order to determine, based on the language settings for each layer acquired in S109, whether the m-th layer is constituted by a single language. In S307, when it is determined that the m-th layer is constituted by a single language (S307: YES), the MFP 1 executes S309-S315 to subsequently proceed to S317. In S307, when it is determined that the m-th layer is not constituted by a single language (S307: NO), the MFP 1 proceeds to S317 without executing S309-S315.

When S309-S315 is executed, in S309, the MFP 1 determines whether a layer group of the language is already constructed. For example, when it is determined that the m-th layer is constituted by only Japanese, in S309 it is determined whether a Japanese layer group is already constructed. When it is determined in S309 that a Japanese layer group is not yet constructed (S309: NO), the MFP 1 executes S311-S313 to subsequently proceed to S315. When it is determined in S309 that the Japanese layer group is already constructed (S309: YES), the MFP 1 proceeds to S315 without executing S311-S313.

When S311-S313 is executed, in S311 the MFP 1 constructs the layer group of the language. For example, when a Japanese layer group is not yet constructed, the Japanese layer group is constructed. In S313, the MFP 1 increments the number of language layer groups. After S313 ends, the processing proceeds to S315. The layer group is constructed when S311 is executed once. Thus, after the layer group is constructed, a positive determination is made in S309, and S311 and S313 are not executed.

When the processing proceeds from S309 or S311 to S315, the MFP 1 synthesizes the layer with the language layer group (in other words, superposes the layer onto other layers in the language layer group). When the m-th layer is a Japanese layer for example, the m-th layer is synthesized with the Japanese layer group. When S315 is executed a plurality of times during the repeated execution of S305-S319, the m-th layer is synthesized with the Japanese layer group at every execution. Thus, the Japanese layer group has structure of including an object corresponding to a single layer obtained by synthesizing a plurality of layers. However, any method may be used to synthesize a plurality of layers to form a layer image of a single layer in the internal processing of the MFP 1 or to handle a plurality of layers as a single layer as required in a data processing, while maintaining a plurality of layers.

When the processing proceeds from S307 or S315 to S317, the MFP 1 increments the counter m. When the processing reaches S319, the processing returns to S305. When the value of the counter m exceeds the number of layers printed when displayed after S305-S319 is executed repeatedly, the processing shown in FIG. 4 is completed. As a result, S201 of FIG. 3 is completed and the processing proceeds to S203. In S203, the MFP 1 executes print target language layer group selection processing. The details of S203 are shown in FIG. 5.

When the print target language layer group selection processing is started, in S401 the MFP 1 sets a selected language layer group to NULL (no value). In S403, the MFP 1 sets a counter i to 1. In S405, the MFP 1 compares the value of the counter i with the number of language layer groups counted in S313 and repeats S405-S419 while the counter i has a value equal to or lower than the number of language layer groups.

When the processing proceeds to S407, the MFP 1 sets a counter j to i+1. In S409, the MFP 1 compares the value of the counter j with the number of language layer groups counted in S313. When the counter j has a value equal to or lower than the number of language layer groups, the MFP 1 executes S409-S415 repeatedly. When the processing proceeds to S411, the MFP 1 determines whether the type and coordinate of the object included in the i-th layer group match those of the j-th layer group.

Figure 5:
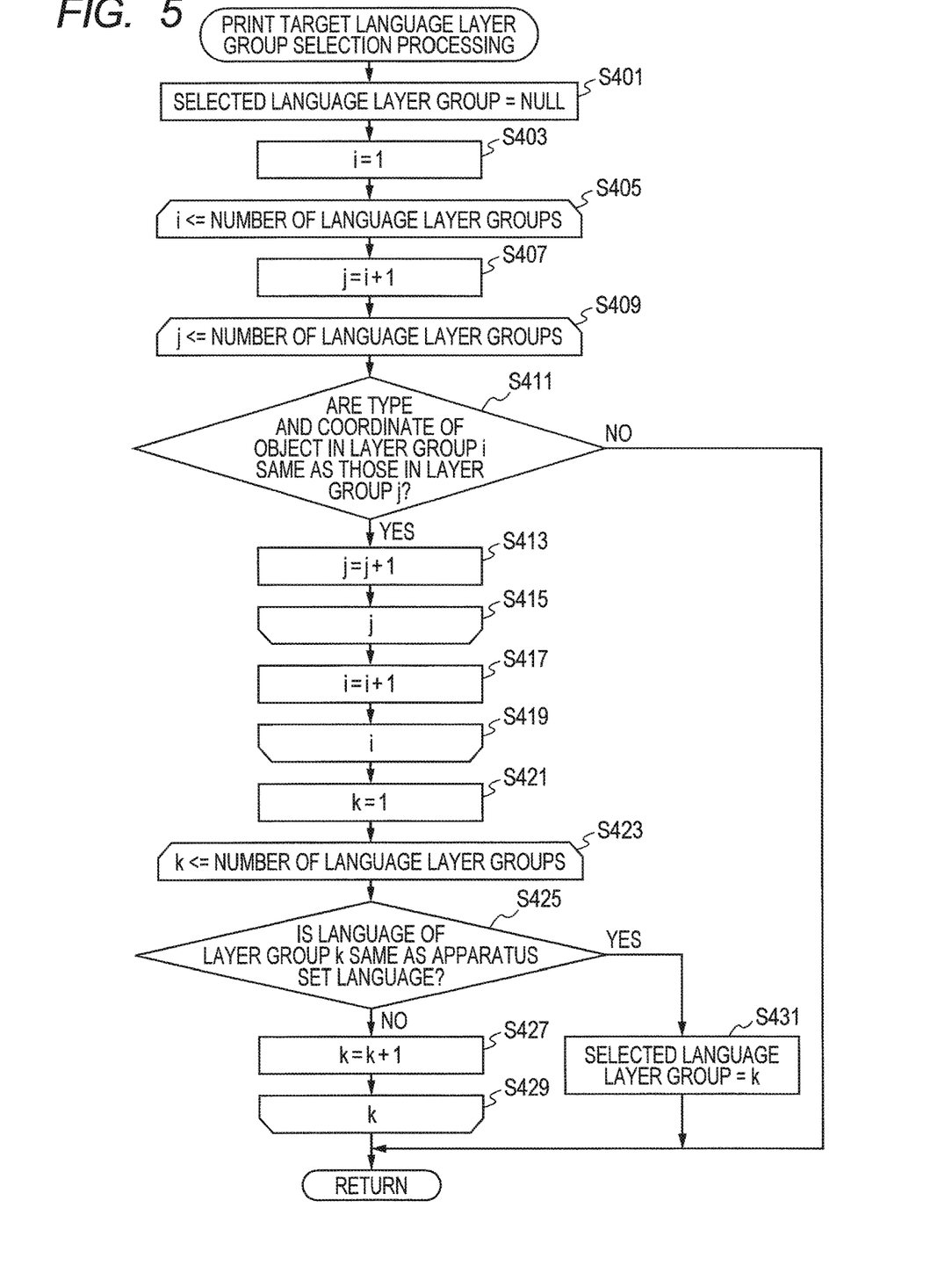
FIG. 5 is a flowchart showing print target language layer group selection processing.

In S411, when the type and coordinate of an object included in the i-th layer group do not match those of the j-th layer group, the processing shown in FIG. 5 ends. A specific example of a case where such a determination is made will be described in detail later. When the type and coordinate of the object included in the i-th layer group match those of the j-th layer group in S411, in S413 the MFP 1 increments the counter j. When the processing reaches S415, the processing returns to S409.

When the value of the counter j exceeds the number of language layer groups after repeatedly executing S409-S415, the processing proceeds to S417. In S417, the MFP 1 increments the counter i. When the processing reaches S419, the processing returns to S405. When S405-S419 as described above are executed repeatedly, the value of the counter i is incremented by one from 1 to the number of language layer groups. The value of the counter j is incremented by one from i+1 to the number of language layer groups.

Thus, in S411 it is sequentially determined, for each combination of two language layer groups select from among all language layer groups, whether the type and coordinate of the objects are the same between the two language layer groups. If it is determined that the type and coordinate of the objects are not the same between any combination of two language layer groups (S411: NO), the subsequent determination is immediately stopped, and the processing shown in FIG. 5 ends. If it is determined that the type and coordinate of the objects are the same between two language layer groups for all the combinations (S411: YES), the repeated processing of S405-S419 are continued to the end and the processing proceeds to S421.

In S421, the MFP 1 sets a counter k to 1. In S423, the MFP 1 compares the value of counter k with the number of language layer groups counted in S313. When the counter k has a value equal to or lower than the number of language layer groups, the MFP 1 repeatedly executes S423-S429. When the processing proceeds to S425, the MFP 1 determines whether a language shown by the language information acquired in S101 (hereinafter also may be referred to as "apparatus set language") is the same as the language of the k-th layer group.

In S425, when the apparatus set language is the same as the language of the k-th layer group (S425:YES), in S431 the MFP 1 sets the value of the counter k to a selected language layer group, and ends the processing shown in FIG. 5. In S425, when the apparatus set language is not the same as the language of the k-th layer group (S425: NO), the MFP 1 in S427 increments the counter k. When the processing reaches S429, the processing returns to S423. When the execution of S423-S429 is repeated and the value of the counter k exceeds the number of language layer groups, the processing shown in FIG. 5 ends.

When a negative determination is made in S411, when S431 ends, and when the repeated processing of S423-S429 ends, the processing shown in FIG. 5 is completed and the processing proceeds to S205. In S205, the MFP 1 determines whether there is a selected language layer group. In a case where there is a selected language layer group, S431 has been executed and thus the selected language layer group is set to a value of one or more. In a case where there is no selected language layer group, S431 has not been executed. Thus, the selected language layer group has NULL as set in S401. Thus, in S205, whether there is a selected language layer group is determined based on whether the selected language layer group is set to a value of one or more.

In S205, when there is no selected language layer group (S205: NO), it means that the PDF file does not include a language layer matching the apparatus set language. In this case, S207-S217 is executed to determine the print target layer based on the default setting of the PDF file. Specifically, in S207, the MFP 1 sets the counter m to 1. In S209, the MFP 1 compares the value of the counter m with the number of layers printed when displayed. While the counter m has a value equal to or lower than the number of layers printed when displayed, the MFP 1 executes S209-S217 repeatedly.

When the processing proceeds to S211, the MFP 1 determines whether the m-th layer is set to be displayed by default. When it is determined in S211 that the m-th layer is set to be displayed by default (S211: YES), in S213 the MFP 1 determines the m-th layer as a print target layer and the processing proceeds to S215. When it is determined in S211 that the m-th layer is not set to be displayed by default (S211: NO), the MFP 1 skips the execution of S213 and proceeds to S215.

When the processing proceeds from S211 or S213 to S215, the MFP 1 increments the counter m. When the processing reaches S217, the processing returns to S209. When the execution of S209-S217 is repeated and the value of the counter m exceeds the number of layers printed when displayed, the processing shown in FIG. 3 ends.

In S205, when there is a selected language layer group (S205: YES), it means that the PDF file includes a language layer matching the apparatus set language. In this case, S225-S237 are executed and it is determined that the language layer matching the apparatus set language as the print target layer. Specifically, in S225, the MFP 1 determines the selected language layer group as the print target layer. Thus, for example, even in a case where the default display setting of the PDF file is an English layer and thus a Japanese layer is not displayed unless a switching operation is performed on the viewer, if the apparatus set language of the MFP 1 is Japanese, the Japanese language layer is selected as the print target.

In S227-S237, for each layer printed when displayed that is not allocated to the language layer group, it is determined whether the layer is set as a print target layer. Specifically, in S227, the MFP 1 sets a counter n to 1. In S229, the MFP 1 compares the value of the counter n with the number of layers not included in the language layer group. While the value of the counter n is equal to or lower than the number of layers not included in the language layer group, S229-S237 are executed repeatedly.

When the processing proceeds to S231, the MFP 1 determines whether the n-th layer is set to be displayed by default. When it is determined in S231 that the n-th layer is set to be displayed by default (S231: YES), in S233 the MFP 1 determines the n-th layer as the print target layer and proceeds to S235. When it is determined in S231 that the n-th layer is not set to be displayed by default (S231: NO), the MFP 1 skips the execution of S233 and proceeds to S235.

When the processing proceeds from S231 or S233 to S235, the MFP 1 increments the counter n. When the processing reaches S237, the processing returns to S229. When the execution of S229-S237 is repeated and the value of the counter n exceeds the number of layers not included in the language layer group, the processing shown in FIG. 3 ends.

When S209-S217 or S229-S237 ends and the processing shown in FIG. 3 ends, it means that S121 of FIG. 2 is completed and the processing proceeds to S123. In S123, the MFP 1 constructs a print image by using the print target layer and executes a print operation. When S123 ends, the print processing is completed.

Print Examples

Figure 6:
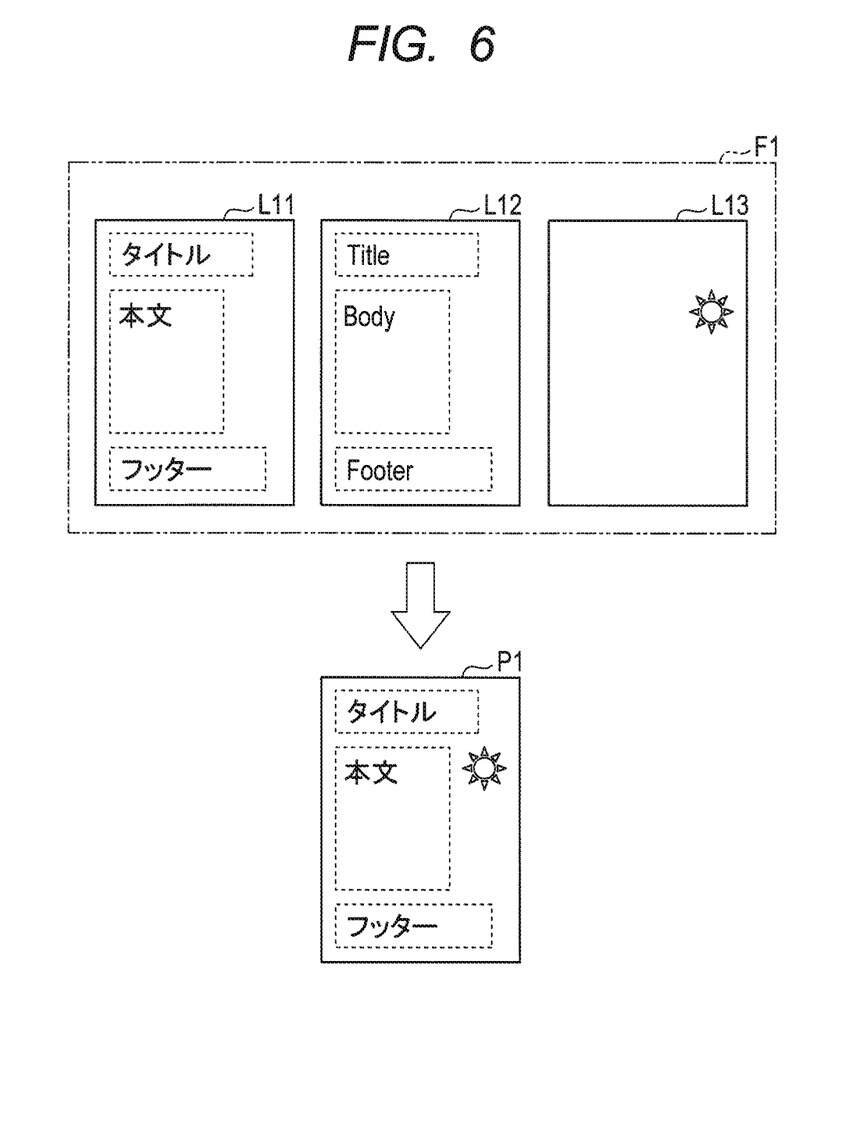
FIG. 6 is an explanatory diagram for illustrating a first print example.

Next, examples of a printed matter that is printed by the above print processing are shown. A first print example shown in FIG. 6 is an example in which the direct print function included in the MFP 1 is used to print the contents of a file F1 to output a printed matter P1. The file F1 includes three layers L11, L12, and L13. The layer L11 includes, as objects, a Japanese-written title, a body, and a footer. The Japanese-written title, body, and footer are arranged in this order from the top. The layer L12 includes, as objects, an English-written title (Title), a body (Body), and a footer (Footer). The layer L13 includes, as an object, image data not depending on a language.

The layer L11 and the layer L12 are layers that can be switched for being displayed. The layer L12 is set to be displayed by default. For each of the layer L11 and the layer L12, the print setting is set to "print when displayed". The layer L13 is always displayed when any of the layer L11 and the layer L12 is switchingly displayed. For the layer L13, the print setting is set to "always print".

Objects included in the layer L11 and the layer L12 are configured so that the respective objects have the same type and coordinate between the layer L11 and the layer L12. Thus, in the above-described print processing, when the layer L11 and the layer L12 are set as the processing target, a positive determination is made in S411 of FIG. 5 and the layer L11 and the layer L12 become the processing target as the language layer. In a case where the apparatus set language of the MFP 1 is Japanese, a positive determination is made in S425 of FIG. 5 in the print processing when the layer L11 is set as the processing target. As a result, the layer L11 is selected as the selected language layer group in S431 of FIG. 5. In S225 of FIG. 3, the layer L11 is determined as the print target layer. Since the layer L13 is a layer for which the print setting is "always print", the layer L13 is determined as the print target layer in S119 of FIG. 2.

As a result of the processing as described above, the layer L11 and the layer L13 are determined as the print target layer, and the printed matter P1 is printed. The file F1 is set such that the layer L12 is displayed by default. In the above-described print processing, because the layer L11 matches the apparatus set language of MFP 1, the layer L11 is determined as the print target layer. It is highly likely that, for a user who sets the apparatus set language of the MFP 1 to Japanese, the file F1 is printed in the desired language when the file F1 is printed by the direct print function.

Figure 7:
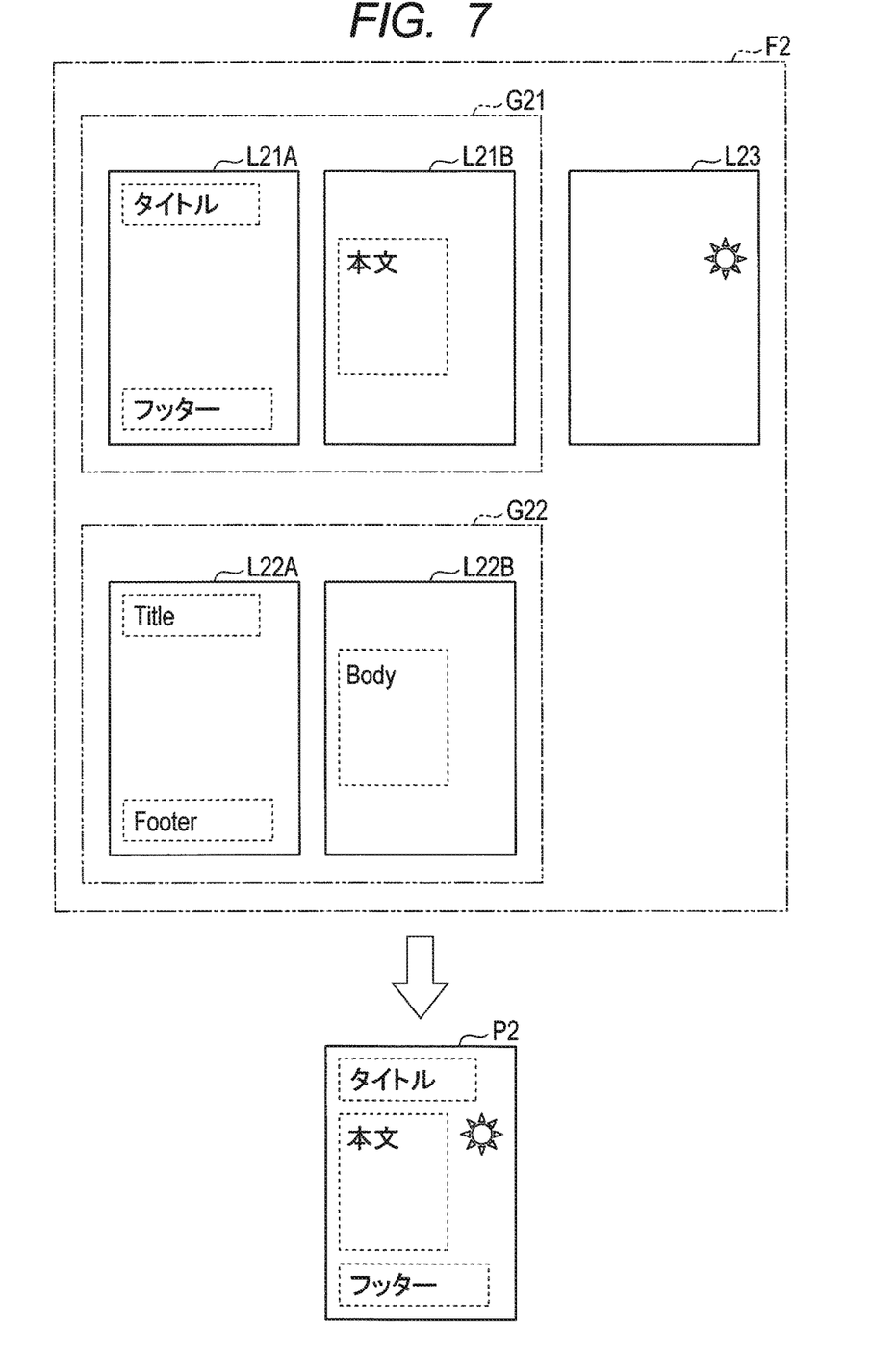
FIG. 7 is an explanatory diagram for illustrating a second print example.

A second print example shown in FIG. 7 is an example in which the direct print function included in the MFP 1 is used to print the contents of a file F2 to output a printed matter P2. The file F2 includes five layers L21A, L21B, L22A, L22B, and L23. The layer L21A includes Japanese-written title and footer as objects. The layer L21B includes a Japanese-written body as an object. The layer L22A includes English-written title (Title) and footer (Footer) as objects. The layer L22B includes an English-written body (Body) as an object. The layer L23 includes, as an object, image data not depending on a language.

The layer L21A and the layer L21B are synthesized into a language layer group G21 in S307-S315 of FIG. 4. The layer L22A and the layer L22B are synthesized into a language layer group G22 in S307-S315 of FIG. 4. In S411 of FIG. 5, the language layer groups G21 and G22 are compared with regard to the type and coordinate of the objects included in the language layer groups G21 and G22. As a result, the language layer groups G21 and G22 include the objects of which the types and coordinates are the same as each other. Thus, a positive determination is made in S411 of FIG. 5. In S425 and S431 of FIG. 5, the language layer group G21 is selected as the selected language layer group. In S225 of FIG. 3, the language layer group G21 (that is, the layer L21A and the layer L21B) is determined as the print target layer. For the layer L23, the print setting is "always printed". Thus, in S119 of FIG. 2, the layer L23 is determined as the print target layer.

As the result of the processing as described above, the layer L21A, the layer L21B, and the layer L23 are determined as the print target layer, and the printed matter P2 is printed. The file F2 has a setting in which the layers L22A, L22B are displayed by default. However, because the layers L21A, L21B match the apparatus set language of the MFP 1, the layers L21A, L21B are determined as the print target layer in the above-described print processing. Thus, it is highly likely that, for a user who sets the apparatus set language of the MFP 1 to Japanese, the file F2 is printed in the desired language when the file F2 is printed by the direct print function.

In the above print processing, in S307-S315 of FIG. 4, the layers corresponding to the same language are synthesized into the single language layer group G21 or G22, and then the types and coordinates of the objects included in the language layer groups G21 and G22 are compared. Thus, the language layer groups G21 and G22 can be appropriately compared with each other for the file F2 including two Japanese layers (the layer L21A and the layer L21B) and two English layers (the layer L22A and the layer L22B).

Figure 8:
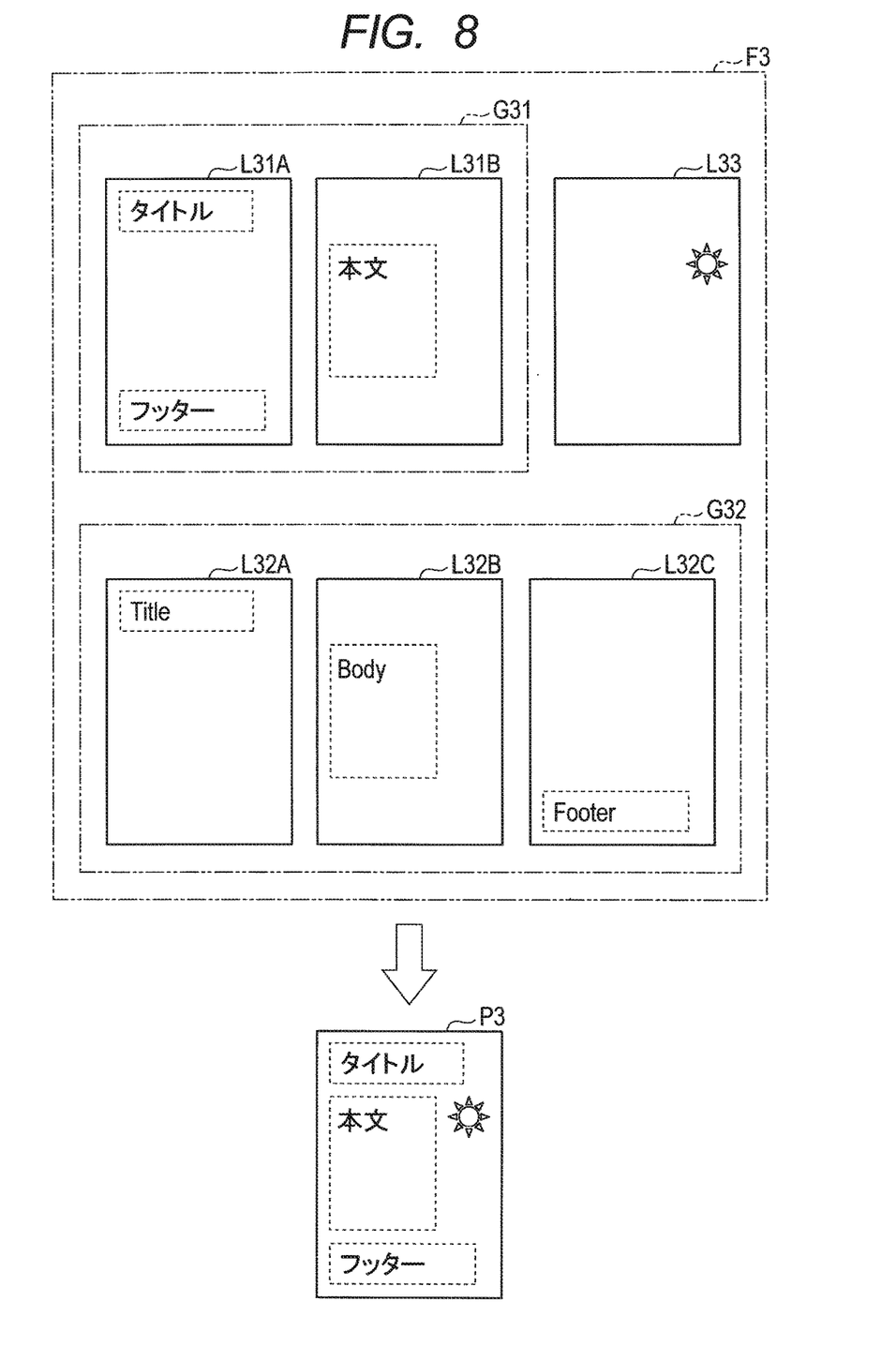
FIG. 8 is an explanatory diagram for illustrating a third print example.

A third print example shown in FIG. 8 is an example in which the direct print function included in the MFP 1 is used to print the contents of a file F3 to output a printed matter P3. The file F3 includes six layers L31A, L31B, L32A, L32B, L32C, and L33. Specifically, the file F3 has a layer configuration obtained by further dividing the object included in the layer L22A of the file F2 shown in FIG. 7 into two layers L32A and L32C.

Even in the case of this layer configuration, in S307-S315 of FIG. 4 in the above print processing, the layers corresponding to the same language are synthesized into the single language layer group G31 or G32, and then the types and coordinates of the objects included in the language layer groups G31 and G32 are compared. Thus, the language layer groups G31 and G32 can be compared with each other for the file F3 including two Japanese layers (the layer L31A and the layer L31B) and three English layers (the layer L32A, the layer L32B, and the layer L32C).

Figure 9A:
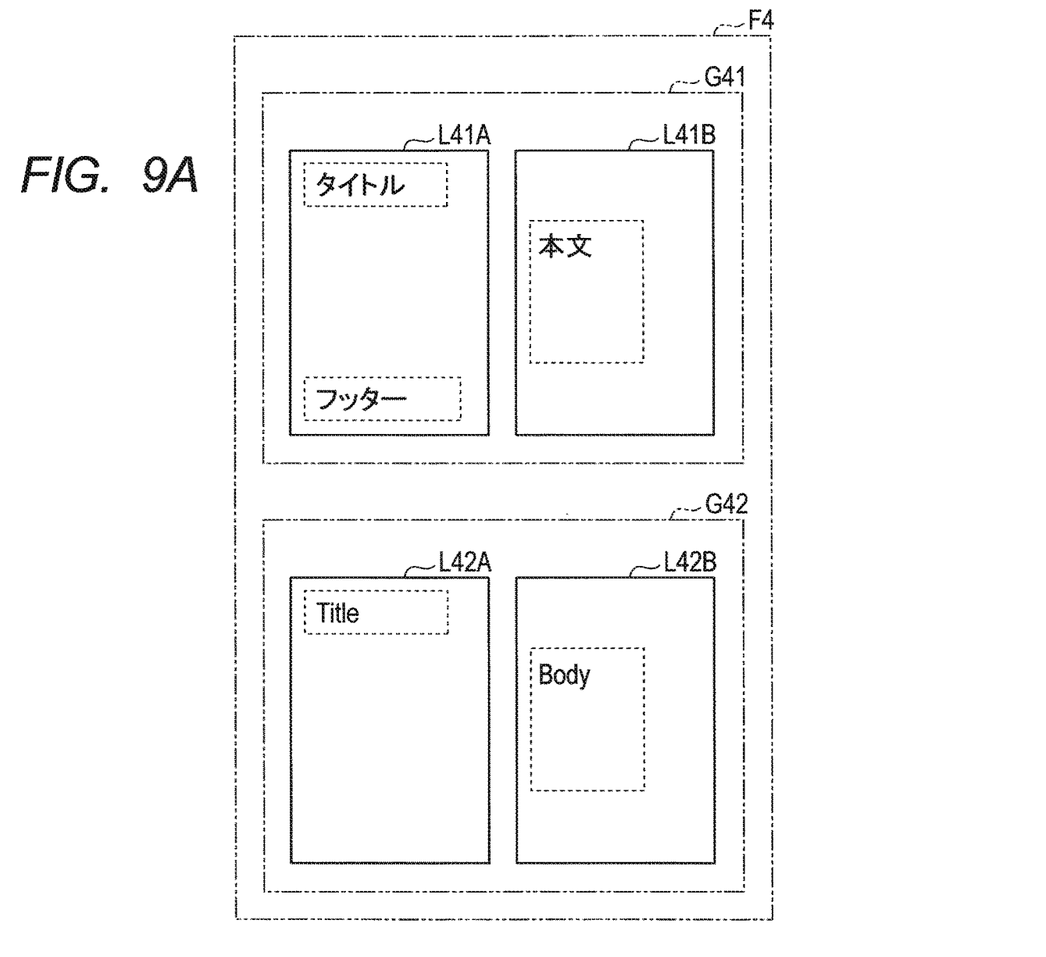
FIG. 9A is an explanatory diagram for illustrating an example in which no selected language layer group is determined in the print target language layer group selection processing in FIG. 5 (a first case)

A file F4 shown in FIG. 9A is an example of a file in which a language layer group G41 and a language layer group G42 have different coordinates of objects. More specifically, an object corresponding to the footer included in the language layer group G41 is not included in the language layer group G42. When the file F4 is the processing target, a negative determination is made in S411 of FIG. 5. In this case, in S205 of FIG. 3, a negative determination is made and four layers L41A, L41B, L42A, and L42B become the processing target of S209-S217. Thus, regarding the four layers L41A, L41B, L42A, and L42B, layers that are set to be displayed by default are determined as the print target layer, regardless of whether the layer is a layer including Japanese or a layer including English.

Figure 9B:
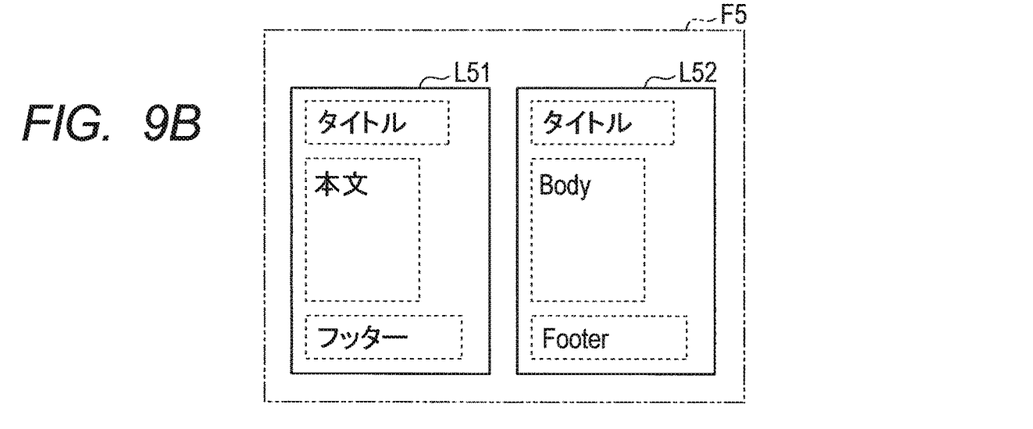
FIG. 9B is an explanatory diagram for illustrating an example in which no selected language layer group is determined in the print target language layer group selection processing in FIG. 5 (a second case).

A file F5 shown in FIG. 9B is an example of a file in which the object included in the layer L52 is not constituted by a single language. Specifically, in the layer L52, the title is in Japanese, and the body and the footer are in English. When the layer L51 including only Japanese text is the processing target, a Japanese language layer group is constructed. When the layer L52 is the processing target, a negative determination is made in S307 of FIG. 4 (S307: NO). In this case, S309-S315 of FIG. 4 is not executed, and no language layer group is constructed. When the number of language layer groups is zero or one, the print target language layer group selection processing shown in FIG. 5 is not substantially executed. Hence, the two layers L51 and L52 become the processing target of S209-S217. Thus, regarding the two layers L51 and L52, the layers that are set to be displayed by default are determined as the print target layer, regardless of whether the layer is a layer including Japanese or a layer including both of Japanese and English.

Advantageous Effects

According to the MFP 1, in a case where a PDF file (one example of a document file) includes a plurality of layers and the plurality of layers includes a layer corresponding to the language of the language information acquired from the NVRAM 114 of the MFP 1 (referred to as selected target layer), a layer including the selected target layer is determined as the print target layer and the print target layer is printed.

The language information acquired from the NVRAM 114 of the MFP 1 shows the language setting of the MFP 1 and it is likely to be the language desired by the user of the MFP 1. Thus, even when a layer corresponding to a language not specified by the language setting of the MFP 1 in the setting in a PDF file is set to be displayed or printed by default, the layer of the language desired by the user of the MFP 1 can be printed by using the direct print function of the MFP 1.

In the present embodiment, when the MFP 1 executes S411 of FIG. 5 and finds that objects included in a plurality of language layers have the same types and drawing positions (coordinates), the MFP 1 executes S425 to determine whether the plurality of language layers includes the selected target layer. This consequently eliminates the process of checking whether a plurality of language layers include the selected target layer, even when the types and drawing positions of the objects included in each of the plurality of language layers are different and it is unknown whether these layers are mutually substitutable.

In the present embodiment, in a case where the plurality of layers includes a plurality of layers corresponding to the same language, the MFP 1 executes S309-S315 to synthesize a plurality of layers corresponding to the same language to form a language layer group corresponding to the plurality of synthesized layers (which corresponds to a single language layer) and then determines whether a plurality of language layers includes the selected target layer. This consequently eliminates the need for individually processing a plurality of layers corresponding to the same language, and the layers can be handled as a single language layer group for each language, thereby simplifying the processing.

In the present embodiment, in a case where a plurality of layers does not include the selected target layer, the MFP 1 executes S209-S217 to print a layer having a display setting of being displayed by default (that is, the first display setting) among layers having a print setting of being printed when displayed (that is, the second print setting). Thus, a printed matter can be printed in accordance with the setting of the PDF file.

[Modifications]

While the disclosure has been described in detail with reference to the above aspects thereof, it would be apparent to those skilled in the art that various changes and modifications may be made therein without departing from the scope of the claims.

For example, in the above embodiment, as the language setting of the MFP 1, one language selected from Japanese and English is set as the apparatus set language. Alternatively, the apparatus set language may be selected from among three or more languages. Further, language layers in a PDF file may correspond to three or more languages. In these cases, too, the above-described print processing can be used to print a printed matter as described in this embodiment.

In the above embodiment, the language setting of the MFP 1 is switched between Japanese and English as an example. Alternatively, the language setting of the MFP 1 may be fixed to one language. For example, the language setting of the MFP 1 may be fixed to Japanese. In this case, for a PDF file including a Japanese layer and an English layer and having a setting that the English layer is displayed by default, the Japanese layer is printed.

In the above embodiment, the language information is acquired from the NVRAM 114 of the MFP 1. Alternatively, the language information may be acquired from information sources other than the MFP 1. For example, when the direct print function is used from the above-mentioned mobile terminal 41, information showing the language setting in the mobile terminal 41 may be transmitted as language information from the mobile terminal 41 to the MFP 1, and the language information may be acquired in the above-described S101. In this case, if a plurality of the mobile terminals 41 has different language settings, a different language layer for each mobile terminal 41 may be selected as the print target.

Alternatively, the language information may be transmitted from the above-mentioned IC card 51 to the MFP 1, for example. Alternatively, an ID stored in the IC card 51 may be transmitted from the IC card 51 to the MFP 1 and the language information associated with the ID may be acquired from the NVRAM 114 of the MFP 1. In this case, too, if a plurality of the IC cards 51 has different language settings, a different language layer for each IC card 51 may be selected as the print target.

This disclosure may be realized in various forms such as a system including the MFP 1 as an element, a program for causing a computer to execute the print processing in the MFP 1, and a non-transitory computer readable storage medium storing the program, in addition to the above-described MFP 1.

A function of one element in the above-described embodiments may be distributedly provided in a plurality of elements. Functions of a plurality of elements may be integrated into one element. A part of the configuration in the above-described embodiments may be omitted. At least part of the configuration in one embodiment may be added to configurations in another embodiment, or may be replaced by a configuration in another embodiment.

As can be seen from the above-described illustrative embodiments, the printer of this disclosure may include the following configurations.

In one aspect of this disclosure, the language information may be information indicative of the language that is set in the language setting of a printer. The language information may be acquired from an information source that is a memory that stores language information in the printer.

In one aspect of this disclosure, the language information may be information indicative of the language that is set in the language setting of an apparatus configured to communicate with the printer. The language information may be acquired from an information source that is the apparatus configured to communicate with the printer.

In one aspect of this disclosure, a first print setting, a second print setting, a third print setting may be provided. A layer print setting is preliminarily set for each of a plurality of layers in a document file. The first print setting indicates that the layer print setting is a layer that is always printed. The second print setting indicates that the layer print setting is a layer that is printed when displayed. The third print setting indicates that the layer print setting is a layer that is not printed. It is determined which print setting each layer has, from among the first print setting, the second print setting, and the third print setting. In a case where the document file includes a plurality of layers, it may be determined whether a selection target layer is included in a determination target layer that is a layer to which the second print setting is set.

In one aspect of this disclosure, in a case where the determination target layer includes a plurality of language layers having different languages between each layer, it may be determined whether the type and the position of an object included in each of the plurality of language layers are the same between the plurality of language layers, and it may be determined, when the type and the position of the object are the same between each layer, the plurality of language layers includes a selection target layer.

In one aspect of this disclosure, in a case where the plurality of layers includes a plurality of layers corresponding to the same language, the plurality of layers corresponding to the same language may be synthesized to form a single language layer corresponding to the synthesized plurality of layers, and then it may be determined whether the plurality of language layers includes the selection target layer.

In one aspect of this disclosure, a layer of a first display setting is displayed by default when the document file is displayed, and a layer of a second display setting is not displayed by default when the document file is displayed. In a case where it is determined that the selection target layer is not included, the layer of the first display setting, among layers of the second print setting, may be determined as the print target layer.

What is claimed is:

1. A printer comprising:
   a print engine configured to print an image on a print medium;
   a processor; and
   a memory storing instructions, the instructions, when executed by the processor, causing the printer to perform:
   in a case where a plurality of layers is included in a document file that is acquired from one of a storage medium connected to the printer and an apparatus configured to communicate with the printer, determining a layer print setting of each of the plurality of layers from among a first print setting, a second print setting, and a third print setting, the layer print setting being preliminarily set to each of the plurality of layers in the document file, the first print setting being indicative of a layer that is always printed, the second print setting being indicative of a layer that is printed when the layer is displayed, the third print setting being indicative of a layer that is not printed;
   determining whether a determination target layer among the plurality of layers includes a selection target layer that is a layer corresponding to a same language as a language indicated by language information acquired from an information source, the determination target layer being a layer to which the second print setting is set;
   in response to determining that the determination target layer includes the selection target layer, determining a layer including the selection target layer as a print target layer; and
   controlling the print engine to print the print target layer.

2. The printer according to claim 1, wherein the language information is information indicative of a language that is set in a language setting of the printer; and wherein the memory further stores instructions, the instructions, when executed by the processor, causing the printer to perform:
acquiring the language information from the memory that stores the language information, the memory being the information source.

3. The printer according to claim 1, wherein the language information is information indicative of a language that is set in a language setting of the apparatus; and
wherein the memory further stores instructions, the instructions, when executed by the processor, causing the printer to perform:
acquiring the language information from the apparatus, the apparatus being the information source.

4. The printer according to claim 1, wherein the memory further stores instructions, the instructions, when executed by the processor, causing the printer to perform:
in a case where the determination target layer includes a plurality of language layers having different languages among each layer, determining whether a type and a position of an object included in each of the plurality of language layers are same as one another among the plurality of language layers; and
in response to determining that the type and the position of the object included in each of the plurality of language layers are same as one another among the plurality of language layers, determining whether the selection target layer is included in the plurality of language layers.

5. The printer according to claim 4, wherein the memory further stores instructions, the instructions, when executed by the processor, causing the printer to perform:
in a case where the plurality of layers includes a plurality of same-language layers corresponding to a same language, synthesizing the plurality of same-language layers to construct a single language layer corresponding to the synthesized plurality of same-language layers, the single language layer constituting one of the plurality of language layers, and then determining whether the plurality of language layers includes the selection target layer.

6. The printer according to claim 4, wherein the memory further stores instructions, the instructions, when executed by the processor, causing the printer to perform:
in a case where objects in a certain layer of the plurality of layers include only text data of a certain language, it is assumed that the certain layer is a language layer of the certain language; and
in a case where objects in a certain layer of the plurality of layers include data other than text data or include text data of two or more languages, it is assumed that the certain layer is not a language layer.

7. The printer according to claim 1, wherein the memory further stores instructions, the instructions, when executed by the processor, causing the printer to perform:
in response to determining that the selection target layer is not included in the determination target layer, determining, as the print target layer, a layer having a display setting that is displayed as default, from among the layer to which the second print setting is set.

8. A method of printing a document file including a plurality of layers, the method comprising:
in a case where a plurality of layers is included in a document file that is acquired from one of a storage medium connected to the printer and an apparatus configured to communicate with the printer, determining a layer print setting of each of the plurality of layers from among a first print setting, a second print setting, and a third print setting, the layer print setting being preliminarily set to each of the plurality of layers in the document file, the first print setting being indicative of a layer that is always printed, the second print setting being indicative of a layer that is printed when the layer is displayed, the third print setting being indicative of a layer that is not printed;
determining whether a determination target layer among the plurality of layers includes a selection target layer that is a layer corresponding to a same language as a language indicated by language information acquired from an information source, the determination target layer being a layer to which the second print setting is set;
in response to determining that the determination target layer includes the selection target layer, determining a layer including the selection target layer as a print target layer; and
controlling a print engine to print the print target layer.

9. A non-transitory computer-readable storage medium storing a set of program instructions for controlling a printer including a processor, a memory, and a print engine configured to print an image on a print medium, the set of program instructions, when executed by the processor, causing the printer to perform:
in a case where a plurality of layers is included in a document file that is acquired from one of a storage medium connected to the printer and an apparatus configured to communicate with the printer, determining a layer print setting of each of the plurality of layers from among a first print setting, a second print setting, and a third print setting, the layer print setting being preliminarily set to each of the plurality of layers in the document file, the first print setting being indicative of a layer that is always printed, the second print setting being indicative of a layer that is printed when the layer is displayed, the third print setting being indicative of a layer that is not printed;
determining whether a determination target layer among the plurality of layers includes a selection target layer that is a layer corresponding to a same language as a language indicated by language information acquired from an information source, the determination target layer being a layer to which the second print setting is set;
in response to determining that the determination target layer includes the selection target layer, determining a layer including the selection target layer as a print target layer; and
controlling the print engine to print the print target layer.

* * * * *